(12) United States Patent
Sun et al.

(10) Patent No.: US 12,217,158 B2
(45) Date of Patent: Feb. 4, 2025

(54) NEURAL NETWORK CIRCUITRY HAVING FLOATING POINT FORMAT WITH ASYMMETRIC RANGE

(71) Applicant: International Business Machines Corporation, Armonk, NY (US)

(72) Inventors: Xiao Sun, Pleasantville, NY (US); Jungwook Choi, Seoul (KR); Naigang Wang, Ossining, NY (US); Chia-Yu Chen, White Plains, NY (US); Kailash Gopalakrishnan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 16/558,554

(22) Filed: Sep. 3, 2019

(65) Prior Publication Data

US 2021/0064976 A1    Mar. 4, 2021

(51) Int. Cl.
*G06N 3/063* (2023.01)
*G06N 3/084* (2023.01)

(52) U.S. Cl.
CPC ............. *G06N 3/063* (2013.01); *G06N 3/084* (2013.01)

(58) Field of Classification Search
CPC .............................. G06N 3/063; G06N 3/084
See application file for complete search history.

(56) References Cited

U.S. PATENT DOCUMENTS

| | | |
|---|---|---|
| 8,161,268 B2 | 4/2012 | Faraj |
| 9,912,349 B1 | 3/2018 | Ouyang et al. |
| 10,019,232 B2 | 7/2018 | Nystad |
| 10,223,635 B2 | 3/2019 | Annapureddy et al. |
| 10,643,124 B2 | 5/2020 | Yu et al. |
| 2015/0356461 A1 | 12/2015 | Vinyals et al. |
| 2017/0286830 A1 | 10/2017 | El-Yaniv et al. |

(Continued)

FOREIGN PATENT DOCUMENTS

| | | |
|---|---|---|
| CN | 106570559 A | 4/2017 |
| WO | 2019009897 A1 | 1/2019 |
| WO | PCT/IB2020/056908 | 11/2020 |

OTHER PUBLICATIONS

A combined IEEE half and single precision floating point multipliers for deep learning. 2017 51st Asilomar Conference on Signals, Systems, and Computers. IEEE, 2017 (Year: 2017).*

(Continued)

*Primary Examiner* — Li B. Zhen
*Assistant Examiner* — Moriam Mosunmola Godo
(74) *Attorney, Agent, or Firm* — Daniel Yeates; Ryan, Mason & Lewis LLP (57) ABSTRACT

An apparatus includes circuitry for a neural network that is configured to perform forward propagation neural network operations on floating point numbers having a first n-bit floating point format. The first n-bit floating point format has a configuration consisting of a sign bit, m exponent bits and p mantissa bits where m is greater than p. The circuitry is further configured to perform backward propagation neural network operations on floating point numbers having a second n-bit floating point format that is different than the first n-bit floating point format. The second n-bit floating point format has a configuration consisting of a sign bit, q exponent bits and r mantissa bits where q is greater than m and r is less than p.

25 Claims, 4 Drawing Sheets

(56) References Cited

U.S. PATENT DOCUMENTS

| | | | |
|---|---|---|---|
| 2018/0211152 | A1 | 7/2018 | Migacz et al. |
| 2018/0307494 | A1 | 10/2018 | Ould-Ahmed-Vall et al. |
| 2018/0307971 | A1 | 10/2018 | Sinha et al. |
| 2018/0308201 | A1 | 10/2018 | Appu et al. |
| 2018/0314940 | A1 | 11/2018 | Kundu et al. |
| 2018/0322382 | A1 | 11/2018 | Mellempudi et al. |
| 2018/0322607 | A1 | 11/2018 | Mellempudi et al. |
| 2019/0012559 | A1 | 1/2019 | Desappan et al. |
| 2019/0042544 | A1 | 2/2019 | Kashyap et al. |
| 2019/0042945 | A1 | 2/2019 | Majumdar et al. |
| 2019/0102671 | A1 | 4/2019 | Cohen et al. |
| 2019/0122100 | A1 | 4/2019 | Kang et al. |
| 2019/0303756 | A1 | 10/2019 | Chiueh et al. |
| 2019/0339937 | A1* | 11/2019 | Lo ................ G06F 7/4876 |
| 2020/0349216 | A1* | 11/2020 | Das Sarma ....... G06F 9/30036 |
| 2021/0255860 | A1* | 8/2021 | Morrison ............ G06N 3/084 |

OTHER PUBLICATIONS

Wang et al. ("Efficient spiking neural network training and inference with reduced precision memory and computing." IET Computers & Digital Techniques 13.5 (2019): 397-404, Jul. 16, 2019) (Year: 2019).*

Mellempudi et al. ("Mixed precision training with 8-bit floating point." arXiv:1905.12334v1 [cs. LG] May 29, 2019 (Year: 2019).*

Raghuraman Krishnamoorthi, "Quantizing Deep Convolutional Networks for Efficient Inference: A Whitepaper," arXiv preprint arXiv:1806.08342V1, Jun. 21, 2018, 36 pages.

S.R. Jain et al., "Trained Uniform Quantization for Accurate and Efficient Neural Network Inference on Fixed-Point Hardware," arXiv preprint arXiv:1903.08066V1, Mar. 19, 2019, 17 pages.

H. Park et al., "Training Deep Neural Network in Limited Precision," arXiv preprint arXiv:1810.05486V1, Oct. 12, 2018, 11 pages.

S.Yin et al., "Minimizing Area and Energy of Deep Learning Hardware Design Using Collective Low Precision and Structured Compression," 51st Asilomar Conference on Signals, Systems, and Computers, Oct. 1, 2017, pp. 1907-1911.

Andrew Gibiansky, "Bringing HPC Techniques to Deep Learning," Machine Learning, Feb. 21, 2017, 11 pages.

ruder.io, "An Overview of Gradient Descent Optimization Algorithms," www.ruder.io/optimizing-gradient-descent/, Jan. 19, 2016, 24 pages.

N. Wang et al., "Training Deep Neural Networks with 8-bit Floating Point Numbers," Proceedings of the 32nd International Conference on Neural Information Processing Systems (NIPS), Dec. 3-8, 2018, 10 pages.

P.C. Lin et al., "FloatSD: A New Weight Representation and Associated Update Method for Efficient Convolutional Neural Network Training," IEEE Journal on Emerging and Selected Topics in Circuits and Systems, Apr. 18, 2019, pp. 267-279, vol. 9, No. 2.

C. Case et al., "NVIDIA Apex: Tools for Easy Mixed-Precision Training in PyTorch," https://devblogs.nvidia.com/apex-pytorch-easy-mixed-precision-training/, Dec. 3, 2018, 9 pages.

S.K. Esser et al., "Learned Step Size Quantization," arXiv preprint arXiv:1902.08153v1, Feb. 21, 2019, 9 pages.

* cited by examiner

NEURAL NETWORK CIRCUITRY HAVING FLOATING POINT FORMAT WITH ASYMMETRIC RANGE

BACKGROUND

A floating point representation of a given number comprises three main parts, a significand that contains the number's digits, an exponent that sets the location where the decimal (or binary) point is placed relative to the beginning of the significand, where negative exponents represent numbers that are very small (i.e. close to zero), and a sign (positive or negative) associated with the number.

A floating point unit (FPU) is a processor or part of a processor, implemented as a hardware circuit, that performs FP calculations. While early FPUs were standalone processors, most are now integrated inside a computer's CPU. Integrated FPUs in modern CPUs are very complex, since they perform high-precision floating point computations while ensuring compliance with the rules governing these computations, for example, as set forth in the Institute of Electrical and Electronics Engineers (IEEE) floating point standards.

The configuration and training of a machine learning model such as, e.g., deep learning neural networks, also referred to as Deep Neural Networks (DNN), is often computationally intensive. Each iteration, or cycle, of the training of a DNN may require many floating point computations. For example, where a DNN includes a large number of nodes, the number of floating point computations that are required to train the DNN scales exponentially with the number of nodes. In addition, the different floating point computations that are used in the DNN training may have different precision requirements.

Machine learning workloads also tend to be computationally demanding. For example, the training algorithms for popular deep learning benchmarks often take weeks to converge when using systems that comprise multiple processors. Specialized accelerators that can provide large throughput density for floating point computations, both in terms of area (computation throughput per square millimeter of processor space) and power (computation throughput per watt of electrical power consumed), are critical metrics for future deep learning systems.

SUMMARY

Embodiments of the invention provide techniques for training and inferencing a neural network using hardware circuitry.

In one embodiment, an apparatus includes circuitry for a neural network. The circuitry is configured to perform forward propagation neural network operations on floating point numbers having a first n-bit floating point format. The first n-bit floating point format has a configuration consisting of a sign bit, m exponent bits and p mantissa bits where m is greater than p. The circuitry is further configured to perform backward propagation neural network operations on floating point numbers having a second n-bit floating point format that is different than the first n-bit floating point format. The second n-bit floating point format has a configuration consisting of a sign bit, q exponent bits and r mantissa bits where q is greater than m and r is less than p.

In another embodiment, a method includes configuring circuitry to perform forward propagation neural network operations on floating point numbers having a first n-bit floating point format. The first n-bit floating point format has a configuration consisting of a sign bit, m exponent bits and p mantissa bits where m is greater than p. The method further includes configuring the circuitry to perform backward propagation neural network operations on floating point numbers having a second n-bit floating point format that is different than the first n-bit floating point format. The second n-bit floating point format has a configuration consisting of a sign bit, q exponent bits and r mantissa bits where q is greater than m and r is less than p. The method further includes operating the circuitry to perform at least one neural network iteration which includes the forward propagation neural network operations and the backward propagation neural network operation.

In yet another embodiment, an apparatus includes circuitry for a neural network. The circuitry is configured to perform forward propagation neural network operations on floating point numbers having a given floating point format. The given floating point format includes a plurality of exponent bits and a given exponent bias for the plurality of exponent bits. The circuitry is further configured to automatically adjust the given exponent bias during the performance of the forward propagation neural network operations.

In another embodiment, a method includes performing, by circuitry for a neural network, forward propagation neural network operations on floating point numbers having a given floating point format. The given floating point format includes a plurality of exponent bits and a given exponent bias for the plurality of exponent bits. The method further includes automatically adjusting the given exponent bias during the performance of the forward propagation neural network operations.

In yet another embodiment, an apparatus includes circuitry for a neural network. The circuitry includes a first precision conversion module and a second precision conversion module. The circuitry is configured to perform forward propagation neural network operations on floating point numbers having a first n-bit floating point format using the first precision conversion module. The first n-bit floating point format has a configuration consisting of a sign bit, m exponent bits and p mantissa bits where m is greater than p. The circuitry is further configured to perform backward propagation neural network operations on floating point numbers having a second n-bit floating point format using the second precision conversion module. The second n-bit floating point format is different than the first n-bit floating point format. The second n-bit floating point format has a configuration consisting of a sign bit, q exponent bits and r mantissa bits where q is greater than m and r is less than p. The circuitry is further configured to automatically adjust the first exponent bias during the performance of the forward propagation neural network operations and to automatically adjust the second exponent bias during the performance of the backward propagation neural network operations.

These and other objects, features and advantages of the present invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems and devices for training and inferencing a machine learning model, e.g., a DNN. However, it is to be understood that embodiments of the invention are not limited to the illustrative methods, systems and devices but instead are more broadly applicable to other suitable methods, systems and devices.

An FPU typically has a fixed bit-width size in terms of the number of binary bits that may be used to represent a number in a floating point format (referred to hereinafter as a "format" or "floating point format"). Some typical FPU bit-width size formats comprise 16-bit, 32-bit, 64-bit and 128-bit formats.

Typically, the larger the bit-width size format of an FPU, the more complex and larger the FPU is in terms of physical size of the semiconductor fabricated circuit. In addition, a larger and more complex FPU also consumes more electrical power and typically takes a longer amount of time to produce an output for a floating point computation.

The disclosed techniques improve the computational efficiency of FPUs when used for training and inferencing neural networks. Specifically, an FPU configured and operated in accordance with an illustrative embodiment reduces the time to converge the training of a neural network without significant loss of accuracy of the resulting trained neural network. In addition, an FPU configured and operated in accordance with an illustrative embodiment reduces the time to inference a trained neural network model without significant loss of accuracy from the expected performance of the model.

Currently available floating point formats result in long compute times, expensive computations in terms of power and other computing resources, and complex and large hardware microarchitectures that must be used for cognitive computing workloads, including but not limited to training and inferencing neural networks. For example, a microarchitecture that uses 128-bit representation must have registers larger enough to store such representations as compared to the microarchitecture that is designed to use only a 32-bit representation. In addition, the 16-bit format typically used in such computations is regarded as the format with the lowest usable precision and is generally not favored in neural network weights training and inferencing where high precision in the weight values is often favored.

Double precision (64-bit) and single precision (32-bit) format representations are structurally complex and prohibitively resource-intensive to use for cognitive computing workloads. One way to improve both the area and power consumption metrics in cognitive computing is to use small bit-width formats for floating point representations for performing as many of the computations as possible. In some cases, a small portion of the computations which are sensitive to rounding errors can still be performed in single precision or double precision format. The use of small bit-width formats for floating point representations may be implemented in very low precision (VLP) computation engines, such as, e.g., FPUs that are configured to use fewer bits than the generally accepted lowest bit-wise floating point format available, i.e., the 16-bit format. For example, with reference to FIG. 1, in illustrative embodiments, an FPU 102 that is configured with an 8-bit floating point format 104 may be used.

Figure 1:
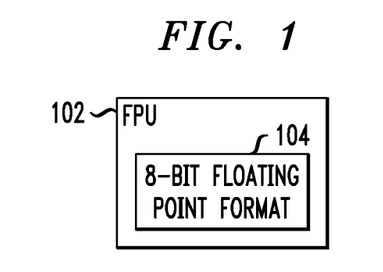
FIG. 1 depicts an apparatus for training and inferencing a neural network, according to an exemplary embodiment of the present invention.

In illustrative embodiments, the disclosed apparatus and techniques may be implemented as a combination of hardware components, software components, firmware components or any combination thereof. In some embodiments, the software or firmware components execute in or operate one or more of the hardware components. For example, the one or more hardware components may comprise an FPU 102 that is modified or configured to perform forward and backward propagation neural network operations in an 8-bit floating point format 104. In some embodiments, the FPU 102 may comprise software, firmware or other program code which configures the FPU 102 to perform the neural network operations in the 8-bit floating point format 104. In some embodiments, a software or firmware application may execute in some combination of (i) the FPU 102, (ii) a data processing system communicating with the FPU 102 over a suitable network, or (iii) some combination of (i) and (ii).

The representation of numbers using floating point formats presents three specific problems. First, the representation must somehow represent the concept of infinity. Second the representation must also have a way of representing "Not a Number" or "NaN", such as the result of a square-root of a negative number. Third, the representation must have a way of representing denormal or subnormal numbers, which are those small values or numbers that fall between all exponent and mantissa bits (excluding the sign bit) in the representation being at binary 0 and only the lowest exponent bit in the representation being at binary one with all other exponent and mantissa bits (excluding the sign bit) in the representation being at binary 0.

As used herein, references to a "very low precision" floating point format refers to a floating point format that uses less than 16 bits. While an 8-bit floating point format is described herein for illustrative purposes, other very low precision floating point formats, such as using a number of bits ranging from 9 bits to 15 bits, or even using a number of bits less than 8 bits for some applications are contemplated within the scope of the illustrative embodiments.

FPU 102 is configured to operate using 8-bit floating point format 104. In an embodiment, 8-bit floating point format 104 may comprise a hybrid floating point format. A hybrid floating point format includes a first floating point format that is configured to represent numbers, e.g., activations and weights, during a forward propagation of a neural network operation and a second floating point format that is configured to represent numbers, e.g., error gradients, during a backward propagation of the neural network operation. As an example, the first floating point format and the second floating point format may be different formats as will be described in more detail below. In some embodiments, the different floating point formats may be different configurations of the 8-bit floating point format for use in forward and backward propagation, respectively.

The eight available bits of an 8-bit floating point format may be divided into three portions, a sign bit, exponent bits and mantissa bits. The sign bit is a single bit that is reserved for indicating a sign of the number, i.e., whether the represented number is positive or negative. The sign bit may be the highest of the eight bits but in some embodiments could be any of the eight bits in a suitably configured FPU 102. The exponent bits are represented by n bits of the 8-bit floating point format which may comprise any of the remaining seven bits in a suitably configured FPU 102. In one non-limiting example format described and used herein for forward propagation operations, n=4. The mantissa bits are represented by p bits of the 8-bit floating point format which may comprise any of the remaining 7-n bits in a suitably configured FPU 102. In the non-limiting example format described and used herein for forward propagation, p=3.

Figure 2:
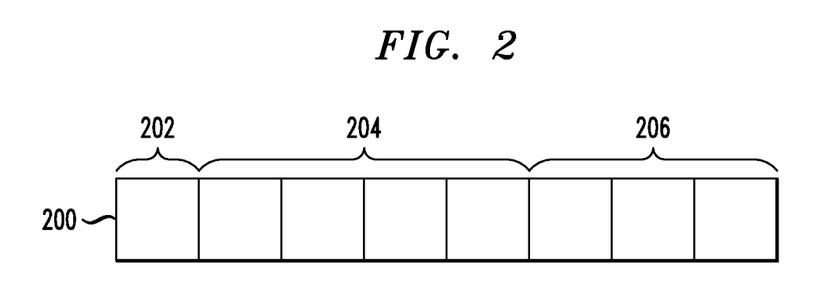
FIG. 2 depicts an example first 8-bit floating point format, according to an exemplary embodiment of the present invention.
Figure 3:
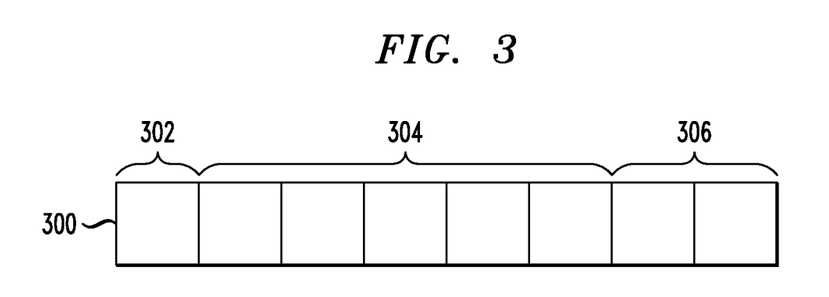
FIG. 3 depicts an example second 8-bit floating point format, according to an exemplary embodiment of the present invention.

For example, with reference to FIGS. 2 and 3, in an illustrative embodiment, FPU 102 is configured as a hybrid FPU which can interchangeably use an 8-bit floating point format 200, e.g., the first floating point format, comprising a sign bit 202, four exponent bits 204 and three mantissa bits 206 in a (1, 4, 3) configuration for forward propagation neural network operations and an 8-bit floating point format 300, e.g., the second floating point format, for backward propagation comprising a sign bit 302, five exponent bits 304 and two mantissa bits 306 in a (1, 5, 2) configuration. The use of the 8-bit floating point format 200 in the (1, 4, 3) configuration for the forward propagation as opposed to the 8-bit floating point format 300 in the (1, 5, 2) configuration yields significantly better results during forward propagation neural network operations, for example, due to the increased precision of the 8-bit floating point format 200. For example, while the 8-bit floating point format 200 in the (1, 4, 3) configuration covers a smaller range than the 8-bit floating point format 300 in the (1, 5, 2) configuration, the 8-bit floating point format 200 also has greater precision.

In addition, in some embodiments, the 8-bit floating point format 200 may be used for forward propagation with a bias B on the exponent bits 204 to provide an asymmetric range for the forward propagation which allows for the coverage of small numbers without causing overflows for large numbers. The use of the bias B allows the 8-bit floating point format 200 to cover the most relevant range of numbers even though the 8-bit floating point format 200 has exchanged a smaller range for enhanced precision as compared to the 8-bit floating point format 300. For example, in some embodiments, a bias B of 4 may be utilized for the exponent bits 204 of the 8-bit floating point format 200 during forward propagation neural network operations.

As an example, the exponent bits 204 comprise four bits in the 8-bit floating point format 200 as seen in the (1, 4, 3) configuration. Without a bias, the exponent bits 204 provide a multiply factor to the mantissa value in a range of $[2^{-7}, 2^8]$. With a bias B, the range is changed to $[2^{-7-B}, 2^{8-B}]$. For example, where the bias B is 4, the range becomes $[2^{-11}, 2^4]$. During testing it was found that the asymmetric range of $[2^{-11}, 2^4]$, when used for activations and weights in forward propagation neural network operations, provides significantly better results than the symmetric range of $[2^{-7}, 2^8]$. In other embodiments, an exponent bias B of any other value may be utilized for forward propagation.

In some embodiments, an exponent bias is not utilized for the 8-bit floating point format 300 in the (1, 5, 2) configuration during backward propagation of error gradients in neural network operations. Instead, the 8-bit floating point format 300 is used unbiased and takes advantage of existing backward propagation loss scaling or auto scaling techniques. In other embodiments, an exponent bias may alternatively be utilized for the 8-bit floating point format 300. Other 8-bit floating point format configurations may alternatively be utilized for the backward propagation of error gradients in neural network operations. For example, an 8-bit floating point format in a (1, 6, 1) configuration may be utilized for backward propagation.

Figure 4:
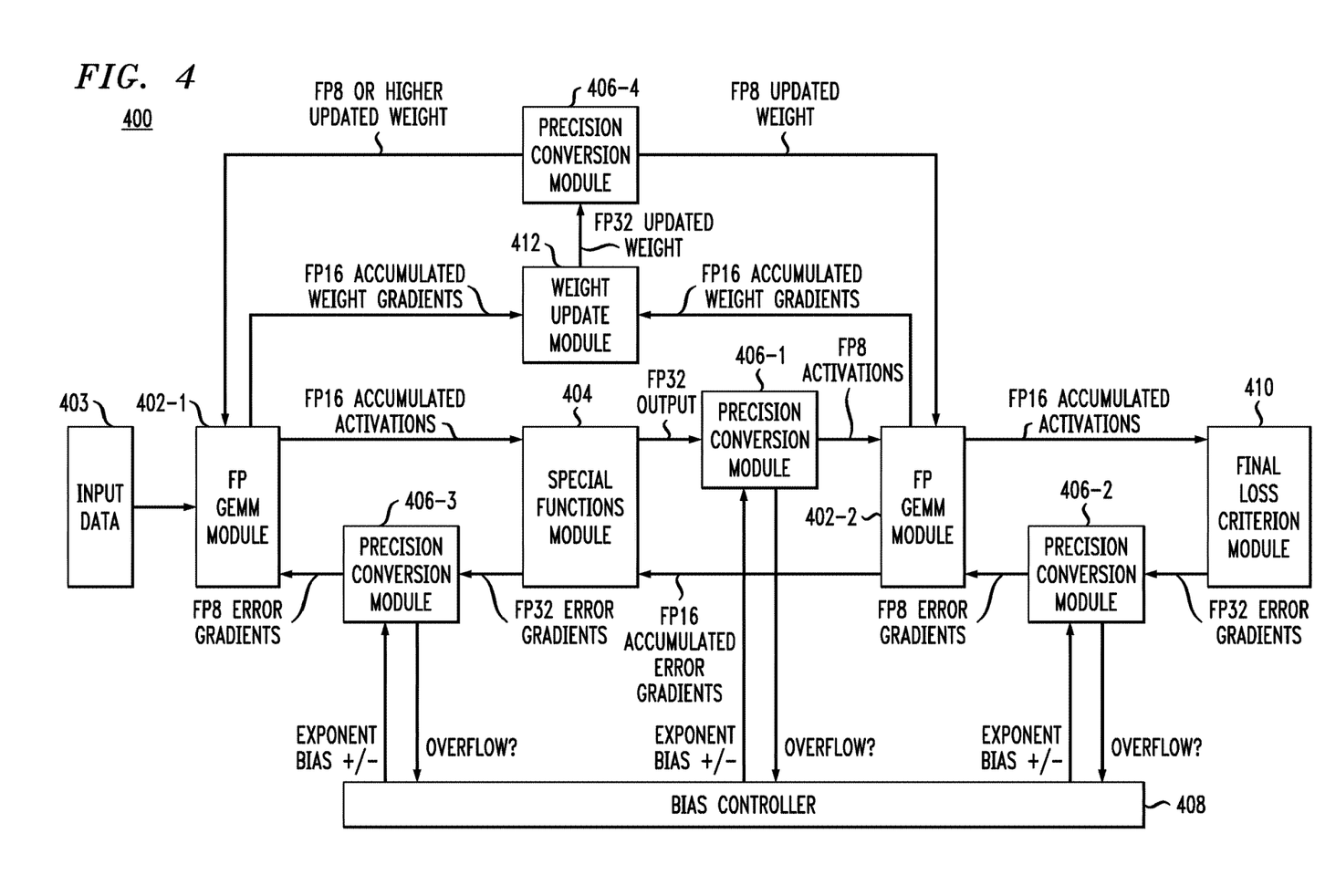
FIG. 4 depicts circuitry of the apparatus of FIG. 1 that is configured for performing forward and back propagation neural network operations, according to an exemplary embodiment of the present invention.

With reference now to FIG. 4, in illustrative embodiments, FPU 102 (FIG. 1) may be configured with circuitry 400 comprising functionality for automatically adjusting the exponent bias B during neural network training or inferencing will now be described with reference to FIG. 4. As seen in FIG. 4, circuitry 400 comprises a number of hardware modules which together are configured to perform the forward and backward propagations of a neural network operation. In some embodiments, both the 8-bit floating point format 200 and 8-bit floating point format 300 may have an exponent bias B that may be automatically adjusted during both the forward and backward propagation of the neural network.

For example, in an illustrative embodiment, circuitry 400 comprises a pair of floating point (FP) general matrix multiple (GEMM) modules 402-1 and 402-2, a special functions module 404, four precision conversion modules 406-1, 406-2, 406-3 and 406-4, a bias controller 408, a final loss criterion module 410 and weight update module 412. In other embodiments, circuitry 400 may comprise any other modules or any other number of the above modules.

The FP GEMM modules 402 are configured to perform floating point multiplication or other floating point operations on floating point numbers having 8-bit or other floating point formats including, for example, the 8-bit floating point format 200 in the (1, 4, 3) configuration and the 8-bit floating point format 300 in the (1, 5, 2) configuration described above. As mentioned above, the FP GEMM modules 402 are configured to handle multiple configurations of 8-bit or other floating point formats. For example, the FP GEMM modules 402 may each be configured to handle floating point numbers, e.g., activations and weights, having the 8-bit floating point format 200 in the (1, 4, 3) configuration during forward propagation neural network operations and may each be configured to handle floating point numbers, e.g., error gradients, having the 8-bit floating point format 300 in the (1, 5, 2) configuration during backward propagation neural network operations. In some embodiments, the FP GEMM modules 402 may be configured to handle 8-bit floating point formats having any other configuration including, for example, a (1, 6, 1) configuration. In some embodiments, the FP GEMM modules 402 may be configured to handle floating point formats that are less than or greater than 8-bit (FP8), for example, 16-bit (FP16), 32-bit (FP32), 64-bit (FP64) or any other floating point format. The outputs of the FP GEMM modules 402 are typically accumulated floating point numbers in an FP16 format when 8-bit floating point formats are used as inputs. For example, FP GEMM modules 402 are configured to output one or more of FP16 accumulated activations (e.g., FP8 activations multiplied by FP8 weights), FP16 accumulated error gradients (e.g., FP8 error gradients of a prior iteration multiplied by FP8 error gradients of a current iteration) and FP16 weight gradients (e.g., FP8 activations multiplied by FP8 error gradients of the current iteration).

The special functions module 404 is configured to perform various special activation functions on the outputs of the FP GEMM modules 402. For example, the special functions module 404 may perform one or more activation functions such as, e.g., linear, exponential linear unit (ELU), rectified linear units (ReLU), leaky ReLU, Sigmoid, Softmax, Tanh, BatchNorm or other activation functions, on the FP16 accumulated activations and FP16 error gradients that are output from the FP GEMM modules 402 to produce one or more of the FP32 activations and FP32 error gradients as outputs. As mentioned above, if the input to the special functions module 404 is in a format other than the FP16 format, the output may comprise a different format. For example, if the input is an FP32 format, the output may comprise an FP64 format.

Precision conversion modules 406 are configured to convert floating point numbers in the FP32 format or other formats such as, e.g., the FP16 format, to the FP8 format. For example, in some embodiments, precision conversion modules 406 are configured to convert the FP32 output, error gradients, or weights to the FP8 format for use as inputs for the FP GEMM modules 402. In some embodiments, the precision conversion modules 406 are configured to progressively adjust the exponent bias B during one or both of the forward and backward propagations.

During the conversion, the precision conversion modules 406 may first determine whether or not the number is out of range, i.e., will underflow or overflow the conversion. If the number is out of range, the precision conversion modules 406 will convert the high-precision FP32 output to the very low precision FP8 activation numbers, error gradients, or weights as minimum or maximum numbers according to equation (1) below:

$$\left[ 2^{-2^{ebit-1}-B+1}, \frac{2^{mbit+1}-1}{2^{mbit}} \times 2^{2^{ebit-1}-B} \right] \quad (1)$$

Where:
ebit is the bit length for the exponent, e.g., ebit is equal to 4 in the (1, 4, 3) configuration and equal to 5 in the (1, 5, 2) configuration;
mbit is the bit length for the mantissa, e.g., mbit is equal to 3 in the (1, 4, 3) configuration and is equal to 2 in the (1, 5, 2) configuration; and
B is the exponent bias.

If the number is in range, the mantissa bits may be downsized in one or more ways including, for example, truncation, nearest-up rounding, nearest-down rounding, stochastic rounding or any other rounding or truncation techniques.

In some embodiments, the precision conversion modules 406 are configured to initially utilize a large exponent bias B that covers otherwise underflowed values during the conversion and to monitor the conversion for any overflow events. For example, an initial exponent bias B of 4 may be utilized. Any other exponent bias B may alternatively be utilized as the initial exponent bias B. In the event of an overflow event during the conversion from the FP32 output to the FP8 activations, error gradients or weights using the increased or large exponent bias B, precision conversion modules 406 are configured to communicate with bias controller 408 to adjust the exponent bias B in a manner that prevents the overflow. The precision conversion modules 406 provide the FP GEMM modules 402 with the adjusted exponent bias B along with the FP8 activations, error gradients or weights.

Bias controller 408 is configured to monitor the precision conversion modules 406 and in response to an overflow at a given precision conversion module 406, to adjust the exponent bias B. For example, the exponent bias B may be reduced by the bias controller 408 to handle the overflow. The adjusted exponent bias B is provided to the given precision conversion module 406 for use in further conversion attempts during this iteration or for use with the next iteration. For example, in some embodiments, each precision conversion module 406 may comprise an independent adjusted exponent bias B that is separate from the exponent bias B of the other precision conversion modules 406.

In some embodiments, the bias controller 408 may alternatively provide the adjusted exponent bias B to each of the other precision conversion modules 406. For example, during each iteration of the forward and backward propagations, the same adjusted exponent bias B may be utilized by each precision conversion module 406 and may be further adjusted in response to an overflow event at any of the precision conversion modules 406.

In this manner, bias controller 408 handles underflow events by increasing the exponent bias while the bias controller 408 handles overflow events reported by the precision conversion modules 406 by reducing the exponent bias.

In some embodiments, bias controller 408 may schedule an increase in the exponent bias B that is provided to the precision conversion modules 406 to shift the covering range of the FP8 format towards small numbers. For example, the increase may be scheduled for every iteration or once for every predetermined number of iterations. In some embodiments, for example, the predetermined number of iterations may comprise 50 iterations, 100 iterations, 500 iterations or any other number of iterations. When the exponent bias B has been increased too much, precision conversion modules 406 will report the overflow event to the bias controller 408 and the exponent bias B is adjusted by the bias controller 408, e.g., reduced, as described above to handle the overflow event. In some embodiments, the increase in the exponent bias B may alternatively be performed by the precision conversion modules 406 themselves.

Final loss criterion module 410 is configured to perform a loss function to generate error gradients for the neural network based on the FP16 accumulated activations from the FP GEMM module 402-2. Loss functions that may be implemented by final loss criterion module 408 may include, for example, maximum likelihood estimation (MLE), cross-entropy (also referred to as logarithmic loss), mean squared error (MSE) or any other loss function that may be used to quantify an error gradient for a neural network. The output of the final loss criterion module 408 comprises one or more FP32 error gradients.

Weight update module 412 is configured to update the weight matrix for the neural network based at least in part on FP16 accumulated weight gradients that are obtained as outputs from the FP GEMM modules 402.

Figure 5:
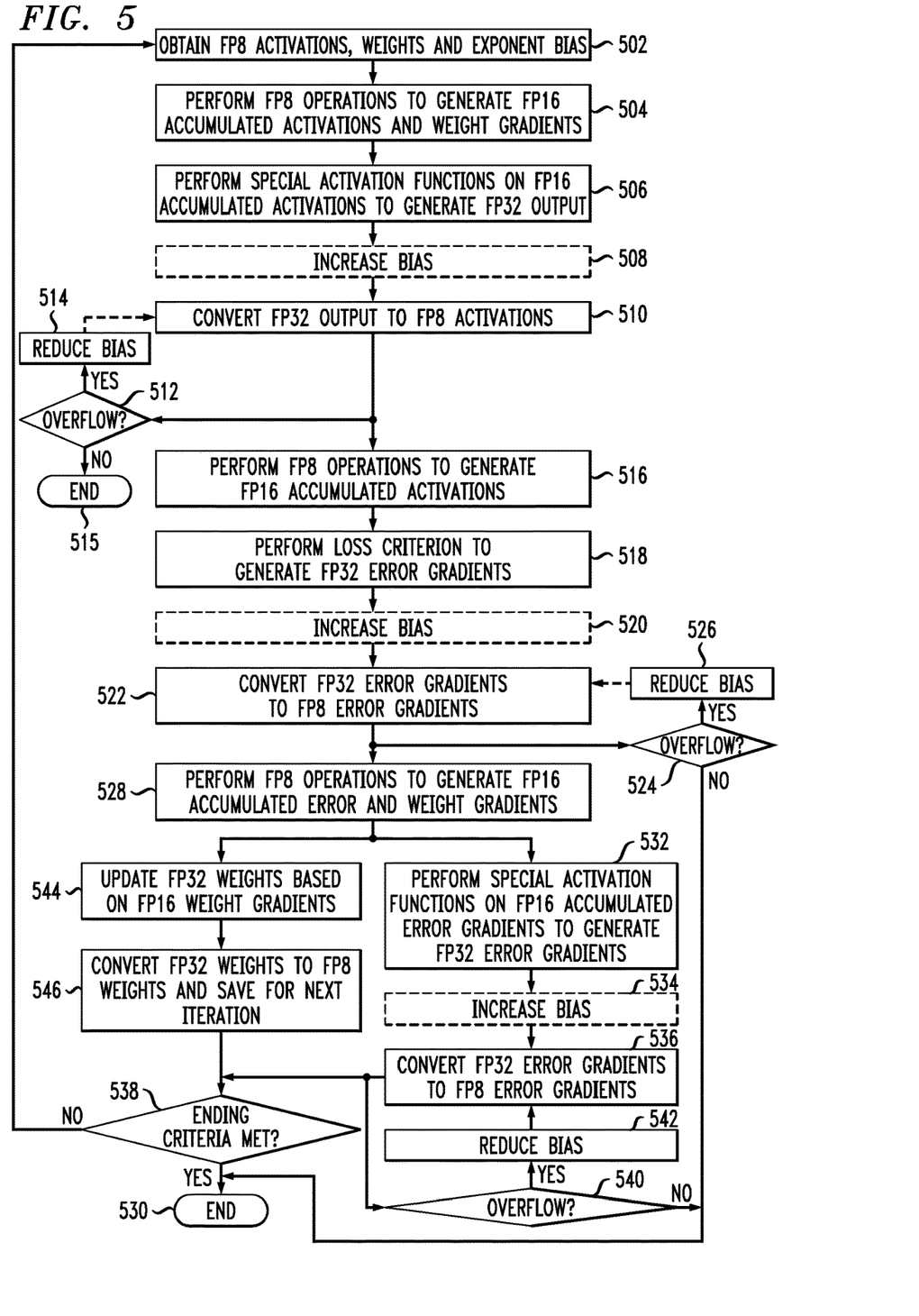
FIG. 5 depicts a process for training a neural network with forward and backward propagation using the circuitry of FIG. 4, according to an exemplary embodiment of the present invention.

With reference now to FIG. 5, an example process for a neural network operation using the circuitry 400 of FPU 102 will now be described. The process of FIG. 5 comprises steps 502 through 546 and performs both forward and backward propagation of the neural network.

At step 502, FP GEMM Module 402-1 obtains FP8 activations, FP8 weights and exponent biases B. In some embodiments, the FP8 activations, FP8 weights and exponent biases B are obtained from the output of a previous layer or iteration of the FP GEMM module 402-1. In some embodiments, the FP8 activations, FP8 weights and exponent biases B may be obtained from input data 403 which may be provided to the circuitry 400 as initialization values. For example, an initial set of FP8 activations, FP8 weights and exponent biases B may be provided as part of training data or a training set for training or inferencing the neural network on the FPU 102. The FP8 weights may be obtained from the weight matrix for the neural network.

At step 504, FP GEMM Module 402-1 performs FP8 operations on the FP8 activations and FP8 weights to generate FP16 accumulated activations. For example, FP GEMM Module 402-1 may perform one or more operations such as, e.g., floating point multiplication operations, on the FP8 activations and FP8 weights to generate the FP16 accumulated activations. The FP GEMM module 402-1 provides the FP16 accumulated activations to the special functions module 404. FP GEMM module 402-1 also performs FP8 operations on the FP8 activations and FP8 error gradients from a previous iteration, if available, to generate FP16 accumulated weight gradients which are provided to weight update module 412.

At step 506, the special functions module 404 performs one or more of the above described activation functions on the FP16 accumulated activations received from the FP GEMM module 402-1 to generate an FP32 output. In some embodiments, the output may alternatively comprise an FP16 output or another floating point output in any other format. The FP32 output is provided by the special functions module 404 to the precision conversion module 406-1.

At step 508, the exponent bias B for precision conversion module 406-1 is increased to cover underflowed values if scheduled. For example, bias controller 408 or another component of circuitry 400 may increase the exponent bias B for the precision conversion module 406-1. The adjusted exponent bias B is then provided to the precision conversion module 406-1. In some embodiments, the same exponent bias B for the precision conversion module 406-1 is also provided to each of the other precision conversion modules 406. In some embodiments, the exponent bias B for the precision conversion module 406-1 may be scheduled to increase on every iteration. In some embodiments, the exponent bias B for the precision conversion module 406-1 may be scheduled to increase once every predetermined number of iterations, e.g., once every 100 iterations, once every 500 iterations, or any other predetermined number of iterations. In some embodiments, the exponent bias B for the precision conversion module 406-1 may be scheduled to increase at the start of the process of FIG. 5, at any other step during the process of FIG. 5 or separately from the process of FIG. 5. For example, as denoted by the dashed lines shown in FIG. 5, step 508 is optionally performed as part of the process of FIG. 5 but may alternatively be performed separately from the process of FIG. 5.

At step 510, the precision conversion module 406-1 converts the FP32 output from the special functions module 404 to FP8 activations. As mentioned above, in some embodiments the output of special functions module 404 may also or alternatively comprise an FP16 output or an output in another floating point format that may be converted by precision conversion module 406-1 to the FP8 activations. As mentioned above, any overflow or underflow during conversion may be capped to a maximum or minimum, respectively, according to equation (1). The FP8 activations are provided to FP GEMM module 402-2 for further processing and the process proceeds to step 516.

In addition, in some embodiments, precision conversion module 406-1 may also perform a bias adjustment process which determines whether or not the exponent bias for the precision conversion module 406-1 should be adjusted by also proceeding to step 512. At step 512, the bias adjustment process, e.g., a separate flow from the process flow of step 516, determines whether or not there was an overflow event during the conversion in step 510. If there was an overflow event, the process proceeds to step 514. If no overflow event has occurred the bias adjustment process ends at step 515. This does not affect the main flow of the process at step 516 which still proceeds.

At step 514, the bias controller 408 reduces the exponent bias B for the precision conversion module 406-1. In some embodiments, the reduced exponent bias B is provided to the precision conversion module 406-1 for use during the next iteration. In some embodiments, the reduced exponent bias B is provided to each of the precision conversion modules 406.

In some embodiments, the reduced exponent bias may optionally be provided to the precision conversion module 406-1 during the current iteration, e.g., by returning to step 510, and the precision conversion module 406-1 may re-convert the FP32 output to the FP8 activations using the reduced bias during the current iteration before providing the FP8 activations to the FP GEMM module 402-2 for further processing at step 516.

At step 516, FP GEMM Module 402-2 performs FP8 operations on the converted FP8 activations to generate FP16 accumulated activations. For example, FP GEMM Module 402-2 may perform one or more operations such as, e.g., floating point multiplication operations, on the converted FP8 activations and the FP8 weights to generate the FP16 accumulated activations. The FP GEMM module 402-2 provides the FP16 accumulated activations to the final loss criterion module 410.

Steps 502 through 516 are performed for each FP8 computable layer of the neural network to generate FP8 activations which are provided to the final loss criterion module 410 for further processing.

At step 518, the final loss criterion module 410 performs loss criterion such as those described above to generate FP32 error gradients. For example, the FP32 error gradients are generated based at least in part on the FP8 activations that are provided by the FP GEMM module 402-2 for each of the FP8 computable layers. The FP32 error gradients are provided to precision conversion module 406-2. In some embodiments, the error gradients may also or alternatively comprise the FP16 format or any other floating point format.

At step 520, the exponent bias B for precision conversion module 406-2 is increased to cover underflowed values if scheduled. For example, bias controller 408 or another component of circuitry 400 may increase the exponent bias B for the precision conversion module 406-2. The adjusted exponent bias B is then provided to the precision conversion module 406-2. In some embodiments, the same exponent bias B is also provided to each of the other precision conversion modules 406. In some embodiments, the exponent bias B for the precision conversion module 406-2 may be scheduled to increase on every iteration. In some embodiments, the exponent bias B for the precision conversion module 406-2 may be scheduled to increase once every predetermined number of iterations, e.g., once every 100 iterations, once every 500 iterations, or any other predetermined number of iterations. In some embodiments, the exponent bias B for the precision conversion module 406-2 may be scheduled to increase at the start of the process of FIG. 5, at any other step during the process of FIG. 5 or separately from the process of FIG. 5. For example, as denoted by the dashed lines shown in FIG. 5, step 520 is optionally performed as part of the process of FIG. 5 but may alternatively be performed separately from the process of FIG. 5.

At step 522, the precision conversion module 406-2 converts the FP32 error gradients output from the final loss criterion module 410 to FP8 error gradients. In some embodiments the output of final loss criterion module 410 may also or alternatively comprise FP16 error gradients or error gradients in another floating point format that may be converted by precision conversion module 406-2 to the FP8 error gradients. As mentioned above, any overflow or underflow during conversion may be capped to a maximum or minimum, respectively, according to equation (1). The FP8 error gradients are provided to FP GEMM module 402-2 for further processing and the process proceeds to step 528.

In addition, in some embodiments, precision conversion module 406-2 may also perform a bias adjustment process which determines whether or not the exponent bias for the precision conversion module 406-2 should be adjusted by also proceeding to step 524. At step 524, the bias adjustment process, e.g., a separate flow from the process flow of step 528, determines whether or not there was an overflow event during the conversion in step 522. If there was an overflow event, the process proceeds to step 526. If no overflow event has occurred the bias adjustment process ends at step 530. This does not affect the main flow of the process at step 528 which still proceeds.

At step 526, the bias controller 408 reduces the exponent bias B for the precision conversion module 406-2. In some embodiments, the reduced exponent bias B is provided to the precision conversion module 406-2 for use during the next iteration. In some embodiments, the reduced exponent bias B is provided to each of the precision conversion modules 406.

In some embodiments, the reduced exponent bias for the precision conversion module 406-2 may optionally be provided to the precision conversion module 406-2 during the current iteration, e.g., by returning to step 522, and the precision conversion module 406-2 may re-convert the FP32 error gradients to the FP8 error gradients using the reduced bias before providing the FP8 error gradients to the FP GEMM module 402-2 for further processing at step 528.

At step 528, FP GEMM Module 402-2 performs FP8 operations on the converted FP8 error gradients to generate FP16 accumulated error gradients. For example, FP GEMM Module 402-2 may perform one or more operations such as, e.g., floating point multiplication operations, on the converted FP8 error gradients and the FP8 weights to generate the FP16 accumulated error gradients. The FP GEMM module 402-2 provides the FP16 accumulated error gradients to the special functions module 404. FP GEMM module 402-2 also performs FP8 operations on the FP8 activations and FP8 error gradients to generate FP16 accumulated weight gradients which are provided to weight update module 412.

Steps 520 through 528 are performed for each FP8 computable layer of the neural network to generate FP16 accumulated error gradients and FP16 accumulated weight gradients. The process then proceeds in parallel to steps 532 and 544. While described as being in parallel, in some embodiments, steps 532 and 544 may be performed in any order and do not need to be performed concurrently.

At step 532, the special functions module 404 performs one or more of the above described activation functions on the FP16 accumulated error gradients received from the FP GEMM module 402-2 to generate FP32 error gradients.

At step 534, the exponent bias B for precision conversion module 406-3 is increased to cover underflowed values if scheduled. For example, bias controller 408 or another component of circuitry 400 may increase the exponent bias B for the precision conversion module 406-3. The adjusted exponent bias B is then provided to the precision conversion module 406-3. In some embodiments, the same exponent bias B for the precision conversion module 406-3 is also provided to each of the other precision conversion modules 406. In some embodiments, the exponent bias B for the precision conversion module 406-3 may be scheduled to increase on every iteration. In some embodiments, the exponent bias B for the precision conversion module 406-3 may be scheduled to increase once every predetermined number of iterations, e.g., once every 100 iterations, once every 500 iterations, or any other predetermined number of iterations. In some embodiments, the exponent bias B for the precision conversion module 406-3 may be scheduled to increase at the start of the process of FIG. 5, at any other step during the process of FIG. 5 or separately from the process of FIG. 5. For example, as denoted by the dashed lines shown in FIG. 5, step 532 is optionally performed as part of the process of FIG. 5 but may alternatively be performed separately from the process of FIG. 5.

At step 536, the precision conversion module 406-3 converts the FP32 error gradients to FP8 error gradients. As mentioned above, any overflow or underflow during conversion may be capped to a maximum or minimum, respectively, according to equation (1). The FP8 error gradients are provided to FP GEMM module 402-1 and saved along with the FP8 activations for further processing in the next iteration. The process then proceeds to step 538.

In addition, in some embodiments, precision conversion module 406-3 may also perform a bias adjustment process which determines whether or not the exponent bias should be adjusted by also proceeding to step 540. At step 540, the bias adjustment process, e.g., a separate flow from the process flow of step 538, determines whether or not there was an overflow event during the conversion in step 540. If there was an overflow event, the process proceeds to step 542. If no overflow event has occurred the bias adjustment process ends at step 530. This does not affect the main flow of the process at step 538 which still proceeds.

At step 542, the bias controller 408 reduces the exponent bias B for the precision conversion module 406-3. In some embodiments, the reduced exponent bias B is provided to the precision conversion module 406-3 for use during the next iteration. In some embodiments, the reduced exponent bias B is provided to each of the precision conversion modules 406.

In some embodiments, the reduced exponent bias may optionally be provided to the precision conversion module 406-3 during the current iteration, e.g., by returning to step 536, and the precision conversion module 406-3 may re-convert the FP32 error gradients to the FP8 error gradients using the reduced bias before providing the FP8 error gradients to the FP GEMM module 402-1 for saving and further processing.

At step 544, in the parallel process weight update module 412 generates FP32 weights based on the FP16 accumulated weight gradients received from FP GEMM modules 402-1 and 402-2 and updates the weight matrix of the neural network based on the generated FP32 weights. The FP32 weights are provided to precision conversion module 406-4.

At step 546, the precision conversion module 406-4 converts the FP32 weights to FP8 weights. As mentioned above, any overflow or underflow during conversion may be capped to a maximum or minimum, respectively, according to equation (1). The FP8 weights are provided to FP GEMM modules 402-1 and 402-2 and saved along with the FP8 activations and FP8 error gradients for further processing in the next iteration. The process then proceeds to step 538.

In addition, in some embodiments, precision conversion module 406-4 may also perform a bias adjustment process similar to that described above with respect to steps 512-515 which determines whether or not the exponent bias should be adjusted. As with steps 512-515, the bias adjustment process, e.g., a separate flow from the process flow of step 538, determines whether or not there was an overflow event during the conversion in step 546 and adjust the bias if needed. This does not affect the main flow of the process at step 538 which still proceeds.

At step 538, circuitry 400 determines whether an ending criterion has been met. For example, circuitry 400 may determine whether the neural network has reached a predetermined level of convergence. If the ending criterion has been met, the process proceeds to step 530 and ends. If the ending criterion has not been met the process returns to step 502 and performs another iteration.

In an example scenario the precision conversion modules 406 may have an initial exponent bias B of 4. At an iteration of the forward or backward propagation that requires precision conversion, the bias controller 408 may increase the exponent bias B for the respective precision conversion module 406 to shift the covering range of the 8-bit floating point format toward smaller numbers. For example, the exponent bias B for a given precision conversion module 406 may be incremented from 4 to 5 on a first iteration, from 5 to 6 on a second iteration and so on. In some embodiments, the increase may be greater than or less than an increment of 1. In some embodiments, the increase may occur on a schedule, for example, once every 50 iterations, 100 iterations or any other number of iterations.

The increased exponent bias B for the given precision conversion module 406 is provided to the given precision conversion module 406 for use in performing conversions from FP32 to FP8. If an overflow event occurs at the given precision conversion module 406, the given precision conversion module 406 reports the overflow to the bias controller 408. In response to the reported overflow, the bias controller 408 decreases the exponent bias B given precision conversion module 406 towards covering larger numbers, for example, by decrementing the value by 1 or any other value, and provides the decreased exponent bias B to the given precision conversion module 406. The decreased exponent bias may be used in future iterations or in some embodiments may be used during a repeated conversion from the FP32 to FP8 formats.

In illustrative embodiments, the exponent bias B of each precision conversion module 406 may be separately adjusted by the bias controller 408 such that different exponent biases B between the precision conversion modules 406 in the forward and backward propagations may be achieved.

As described above, the FP GEMM modules perform floating point operations on FP8 activations, FP8 error gradients and FP8 weights. For example, in the forward propagation, the FP GEMM modules process FP8 activations and FP8 weight gradients to generate FP16 accumulated activations. In the backward propagation, the FP GEMM modules process FP8 error gradients and FP8 weights to generated FP16 error gradients. In a weight gradients calculation, the FP GEMM modules process the FP8 activations and the FP8 error gradients to generate FP16 weight gradients.

In one example, the FP GEMM modules multiplies the FP8 weights and the FP8 activations from the previous layer and the special function to generate FP16 accumulated activations for the current layer according to equation (2) below:

$$A_{current} = W \text{ conv } A_{previous} \quad (2)$$

Where:
W is the weight;
$A_{previous}$ is the previous activations; and
$A_{current}$ is the current calculated activations.

FP16 error gradients and FP16 weight gradients may be calculated in a similar manner using their respective inputs.

In some embodiments, the precision conversion modules 406 may comprise separate exponent biases for each type of propagation or calculation that may be separately adjusted by the bias controller 408. For example, a given FP GEMM module 402 may comprise a first exponent bias for forward propagation (accumulated activations calculations), a second exponent bias for backward propagation (accumulated error gradients calculations), and a third exponent bias for weight gradient calculations.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
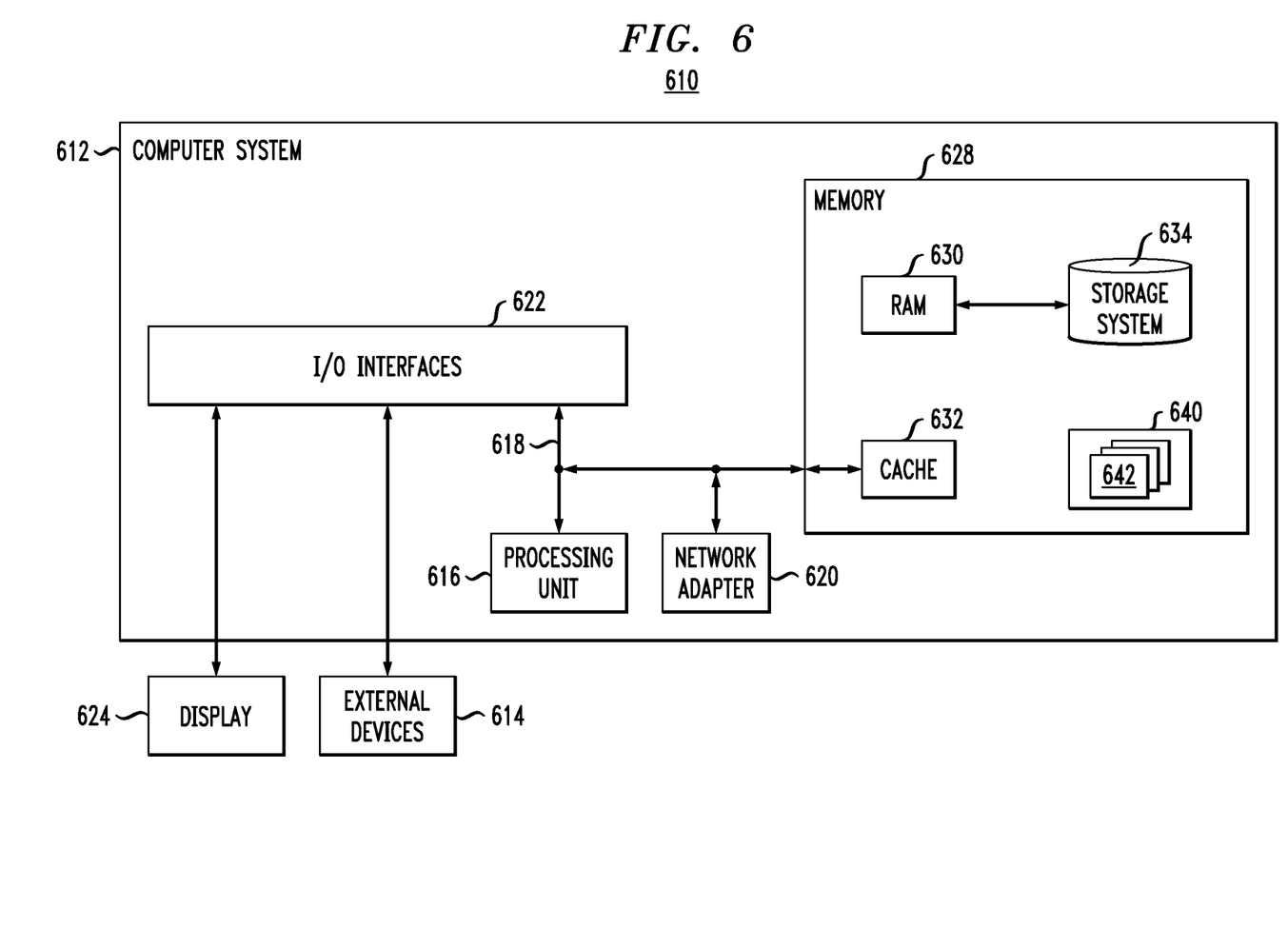
FIG. 6 depicts a computer system in accordance with which one or more components/steps of techniques of the invention may be implemented, according to an exemplary embodiment of the invention.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processing unit 616. In an illustrative embodiment, processing unit 616 comprises FPU 102. In other embodiments, processing unit 616 may be separate from FPU 102 and configured to communicate with FPU 102 via bus 618 or a network adapter 620.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, 77, etc.) that enable computer system/server 612 to communicate with one or more other computing devices. Such communication can occur via I/O interfaces 622. Still yet, computer system/server 612 can communicate with one or more networks such as a LAN, a general WAN, and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples include, but are not limited to, microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
control circuitry configured to perform neural network operations on floating point numbers during a neural network training process which comprises forward propagation neural network operations and backward propagation neural network operations, wherein the control circuitry comprises floating point unit circuitry, wherein the control circuitry is configured to:
selectively configure the floating point unit circuitry during the neural network training process to operate on floating point numbers with different n-bit floating point formats for the forward propagation neural network operations and the backward propagation neural network operations, the different n-bit floating point formats having a same number n of bits, but different formats with respect to exponent bits and mantissa bits, wherein in selectively configuring the floating point unit circuitry, the control circuitry is configured to:
selectively configure the floating point unit circuitry during the neural network training process to operate using a first n-bit floating point format to perform the forward propagation neural network operations on floating point numbers having the first n-bit floating point format, the first n-bit floating point format having a configuration consisting of a sign bit, m exponent bits and p mantissa bits where m is greater than p;
selectively configure the floating point unit circuitry during the neural network training process to operate using a second n-bit floating point format to perform the backward propagation neural network operations on floating point numbers having the second n-bit floating point format that is different than the first n-bit floating point format, the second n-bit floating point format having a configuration consisting of a sign bit, q exponent bits and r mantissa bits where q is greater than m and r is less than p; and
selectively convert computation results, which are generated and output from the floating point unit circuitry as a result of performing the forward and backward propagation neural network operations, into one of the first n-bit floating point format and the second n-bit floating point format for further processing by the floating point unit circuitry in a next iteration of the neural network training process.

2. The apparatus of claim 1, wherein the floating point numbers having the first n-bit floating point format comprise at least one of activations and weights for a neural network.

3. The apparatus of claim 1, wherein the floating point numbers having the second n-bit floating point format comprise error gradients for a neural network.

4. The apparatus of claim 1, wherein the control circuitry is further configured to apply an exponent bias to the exponent bits of the first n-bit floating point format, the exponent bias being configured to provide an asymmetrical dynamic range for the floating point numbers having the first n-bit floating point format.

5. The apparatus of claim 4, wherein the control circuitry is configured to apply no exponent bias to the exponent bits of the second n-bit floating point format.

6. The apparatus of claim 1, wherein:
the configuration of the first n-bit floating point format consists of a sign bit, four exponent bits and three mantissa bits; and
the configuration of the second n-bit floating point format is selected from the group consisting of:
a sign bit, five exponent bits and two mantissa bits; and
a sign bit, six exponent bits and one mantissa bit.

7. A method comprising:
utilizing floating point unit circuitry to perform at least one iteration of a neural network training process, the at least one iteration comprising forward propagation neural network operations and backward propagation neural network operations, wherein utilizing the floating point unit circuitry to perform the at least one iteration of the neural network training process comprises:
selectively configuring the floating point unit circuitry during the neural network training process to operate on floating point numbers with different n-bit floating point formats for the forward propagation neural network operations and the backward propagation neural network operations, the different n-bit floating point formats having a same number n of bits, but different formats with respect to exponent bits and mantissa bits, wherein in selectively configuring the floating point unit circuitry comprises:
selectively configuring the floating point unit circuitry during the neural network training process to operate using a first n-bit floating point format to perform the forward propagation neural network operations on floating point numbers having the first n-bit floating point format, the first n-bit floating point format having a configuration consisting of a sign bit, m exponent bits and p mantissa bits where m is greater than p;
selectively configuring the floating point unit circuitry during the neural network training process to operate using a second n-bit floating point format to perform the backward propagation neural network operations on floating point numbers having the second n-bit floating point format that is different than the first n-bit floating point format, the second n-bit floating point format having a configuration consisting of a sign bit, q exponent bits and r mantissa bits where q is greater than m and r is less than p; and
selectively converting computation results, which are generated and output from the floating point unit circuitry as a result of performing the forward and backward propagation neural network operations, into one of the first n-bit floating point format and the second n-bit floating point format for further processing by the floating point unit circuitry in a next iteration of the neural network training process.

8. The method of claim 7, wherein the floating point numbers having the first n-bit floating point format comprise at least one of activations and weights for a neural network.

9. The method of claim 7, wherein the floating point numbers having the second n-bit floating point format comprise error gradients for a neural network.

10. The method of claim 7, further comprising configuring the floating point unit circuitry to apply an exponent bias to the exponent bits of the first n-bit floating point format, the exponent bias being configured to provide an asymmetrical dynamic range for the floating point numbers having the first n-bit floating point format.

11. The method of claim 10, wherein the floating point unit circuitry is configured to apply no exponent bias to the exponent bits of the second n-bit floating point format.

12. The method of claim 7, wherein:
the configuration of the first n-bit floating point format consists of a sign bit, four exponent bits and three mantissa bits; and
the configuration of the second n-bit floating point format is selected from the group consisting of:
a sign bit, five exponent bits and two mantissa bits; and
a sign bit, six exponent bits and one mantissa bit.

13. An apparatus, comprising:
control circuitry for a neural network, the control circuitry comprising floating point unit circuitry, wherein the control circuitry is configured to:
configure the floating point unit circuitry to perform forward propagation neural network operations on floating point numbers of activation values and weight values having a first n-bit floating point format, wherein n is 8 or less, wherein the first n-bit floating point format comprises a first plurality of exponent bits and a first exponent bias for the first plurality of exponent bits, wherein the forward propagation neural network operations comprise multiplying n-bit floating point activation values and n-bit floating point weight values to compute $2n$-bit floating point accumulated activation values, and performing activation function operations on the $2n$-bit floating point accumulated activation values to compute $4n$-bit floating point output values;
perform a conversion process to convert the $4n$-bit floating point output values to n-bit floating point values, which have the first n-bit floating point format, for subsequent processing by the floating point unit circuitry, and monitor the conversion process for an occurrence of an overflow event;
automatically adjust the first exponent bias of the first n-bit floating point format, in response to the occurrence of an overflow event during the conversion process to prevent overflow;
configure the floating point unit circuitry to utilize the first n-bit floating point format with the adjusted first exponent bias for a next iteration of the forward propagation neural network operations; and
configure the floating point unit circuitry to perform backward propagation neural network operations on floating point numbers of error gradient values having a second n-bit floating point format, which comprises a same total number of bits as the first n-bit floating point format, and a second plurality of exponent bits having a number of exponent bits which differs from a number of exponent bits of the first plurality of exponent bits.

14. The apparatus of claim 13, wherein the control circuitry comprises:
a precision conversion module that is configured to perform the conversion process using the first exponent bias as an initial exponent bias for a current iteration of the forward propagation neural network operations; and
a bias controller that is configured to monitor the conversion process for the occurrence of an overflow event and automatically adjust the initial exponent bias to generate an adjusted exponent bias in response to the occurrence of an overflow event, and provide the adjusted exponent bias to the precision conversion module to perform the conversion process for the current iteration using the adjusted exponent bias.

15. The apparatus of claim 14, wherein the bias controller is configured to decrease the first exponent bias in response to the occurrence of an overflow event during the conversion process.

16. The apparatus of claim 14, wherein the bias controller is further configured schedule an automatic increase in the initial exponent bias that is utilized by the precision conversion module to perform the conversion process, over a plurality of iterations of the forward propagation neural network operations, until an overflow event occurs when performing a given conversion process during a given iteration of the forward propagation neural network operations.

17. The apparatus of claim 13, wherein the control circuitry is further configured to:
configure the floating point unit circuitry to perform the backward propagation neural network operations on the floating point numbers of error gradient values having the second n-bit floating point format, which comprises a second exponent bias for the second plurality of exponent bits, wherein the backward propagation neural network operations comprise multiplying n-bit floating point error gradient values of a prior iteration of the backward propagation neural network operations and n-bit floating point error gradient values of a current iteration of the backward propagation neural network operations to compute $2n$-bit floating point accumulated error gradient values, and performing activation function operations on the $2n$-bit floating point accumulated error gradient values to compute $4n$-bit floating point error gradient values;
perform a conversion process to convert the $4n$-bit floating point error gradient values to n-bit floating point error gradient values, which have the second n-bit floating point format, for subsequent processing by the floating point unit circuitry, and monitor the conversion process for an occurrence of an overflow event;
automatically adjust the second exponent bias of the second n-bit floating point format, in response to the occurrence of an overflow event during the conversion process to prevent overflow; and
configure the floating point unit circuitry to utilize the second n-bit floating point format with the adjusted second exponent bias for a next iteration of the backward propagation neural network operations.

18. The apparatus of claim 17, wherein the control circuitry is configured to automatically adjust the second exponent bias independent of the first exponent bias.

19. A method, comprising:
configuring, by control circuitry for a neural network, floating point unit circuitry to perform forward propagation neural network operations on floating point numbers of activation values and weight values having a first n-bit floating point format, wherein n is 8 or less, wherein the first n-bit floating point format comprises a first plurality of exponent bits and a first exponent bias for the first plurality of exponent bits, wherein the forward propagation neural network operations comprise multiplying n-bit floating point activation values and n-bit floating point weight values to compute $2n$-bit floating point accumulated activation values, and performing activation function operations on the $2n$-bit floating point accumulated activation values to compute $4n$-bit floating point output values;
performing, by the control circuitry, a conversion process to convert the $4n$-bit floating point output values to n-bit floating point values, which have the first n-bit floating point format, for subsequent processing by the floating point unit circuitry, and monitoring the conversion process for an occurrence of an overflow event;
automatically adjusting, by the control circuitry, the first exponent bias of the first n-bit floating point format to provide an adjusted exponent bias, in response to the occurrence of an overflow event during the conversion process to prevent overflow;
configuring, by the control circuitry, the floating point unit circuitry to utilize the first n-bit floating point format with the adjusted exponent bias for a next iteration of the forward propagation neural network operations; and
configuring, by the control circuitry, the floating point unit circuitry to perform backward propagation neural network operations on floating point numbers of error gradient values having a second n-bit floating point format, which comprises a same total number of bits as the first n-bit floating point format, and a second plurality of exponent bits having a number of exponent bits which differs from a number of exponent bits of the first plurality of exponent bits.

20. The method of claim 19, wherein:
performing the conversion process comprises using the first exponent bias as an initial exponent bias for a current iteration of the forward propagation neural network operations; and
automatically adjusting the first exponent bias of the first n-bit floating point format, comprises adjusting the initial exponent bias to provide the adjusted exponent bias in response to the occurrence of an overflow event, and utilizing the adjusted exponent bias by a precision conversion module to perform the conversion process for the current iteration.

21. The method of claim 19, wherein automatically adjusting the first exponent bias in response to the occurrence of an overflow event comprises decreasing the first exponent bias.

22. The method of claim 19, further comprising scheduling, by the control circuitry, an automatic increase in the first exponent bias that is utilized to perform the conversion process, over a plurality of iterations of the forward propagation neural network operations, until an overflow event occurs when performing a given conversion process during a given iteration of the forward propagation neural network operations.

23. The method of claim 19, further comprising:
configuring, by the control circuitry, the floating point unit circuitry to perform the backward propagation neural network operations on the floating point numbers of error gradient values having the second n-bit floating point format, which comprises a second exponent bias for the second plurality of exponent bits, wherein the backward propagation neural network operations comprise multiplying n-bit floating point error gradient values of a prior iteration of the backward propagation neural network operations and n-bit floating point error gradient values of a current iteration of the backward propagation neural network operations to compute $2n$-bit floating point accumulated error gradient values, and performing activation function operations on the $2n$-bit floating point accumulated error gradient values to compute $4n$-bit floating point error gradient values;
performing, by the control circuitry, a conversion process to convert the $4n$-bit floating point error gradient values to n-bit floating point error gradient values, which have the second n-bit floating point format, for subsequent processing by the floating point unit circuitry, and monitor the conversion process for an occurrence of an overflow event;

automatically adjusting, by the control circuitry, the second exponent bias of the second n-bit floating point format, in response to the occurrence of an overflow event during the conversion process to prevent overflow; and configuring, by the control circuitry, the floating point unit circuitry to utilize the second n-bit floating point format with the adjusted second exponent bias for a next iteration of the backward propagation neural network operations.

24. The method of claim 23, wherein the second exponent bias is automatically adjusted independent of the first exponent bias.

25. An apparatus, comprising:

control circuitry for a neural network, the control circuitry comprising floating point unit circuitry;

the control circuitry being configured to:

selectively configure the floating point unit circuitry during a neural network training process to operate on floating point numbers with different n-bit floating point formats for forward propagation neural network operations and backward propagation neural network operations, the different n-bit floating point formats having a same number n of bits, but different formats with respect to exponent bits and mantissa bits, wherein in selectively configuring the floating point unit circuitry, the control circuitry is configured to:

selectively configure the floating point unit circuitry during the neural network training process to operate using a first n-bit floating point format to perform forward propagation neural network operations on floating point numbers having the first n-bit floating point format, the first n-bit floating point format having a configuration consisting of a sign bit, m exponent bits, a first exponent bias, and p mantissa bits where m is greater than p;

selectively configure the floating point unit circuitry during the neural network training process to operate using a second n-bit floating point format to perform backward propagation neural network operations on floating point numbers having the second n-bit floating point format, the second n-bit floating point format being different than the first n-bit floating point format, the second n-bit floating point format having a configuration consisting of a sign bit, q exponent bits, a second exponent bias, and r mantissa bits where q is greater than m and r is less than p;

perform a conversion process to selectively convert computation results, which are generated and output from the floating point unit circuitry as a result of performing the forward and backward propagation neural network operations, into one of the first n-bit floating point format and the second n-bit floating point format for further processing by the floating point unit circuitry in a next iteration of the neural network training process;

automatically adjust the first exponent bias of the first n-bit floating point format during the performance of the forward propagation neural network operations, in response to determining that conversion of a given computation result of a given forward propagation neural network operation will underflow or overflow the conversion of the given computation result; and automatically adjust the second exponent bias of the second n-bit floating point format during the performance of the backward propagation neural network operations, in response to determining that conversion of a given computation result of a given backward propagation neural network operation will underflow or overflow the conversion of the given computation result.

* * * * *